United States Patent Office 3,429,840
Patented Feb. 25, 1969

3,429,840
ACRYLIC RESINS CONTAINING CELLULOSE BUTYRATE BENZOATE, COATINGS AND COMPOSITIONS
Jack W. Lowe, Jr., and Gilliam S. Teague, Jr., Kingsport, Tenn., assignors to Eastman Kodak Company, Rochester, N.Y., a corporation of New Jersey
No Drawing. Filed Aug. 14, 1967, Ser. No. 660,231
U.S. Cl. 260—15      9 Claims
Int. Cl. C08b 21/06

ABSTRACT OF THE DISCLOSURE

Lacquers containing either thermoplastic or thermosetting acrylic resin, and cellulose butyrate benzoate provide improved lacquers for such applications as automotive finishes.

---

This invention concerns coatings, coating compositions and coating methods utilizing either thermoplastic or thermosetting acrylic resins in blends with cellulose butyrate benzoate, particularly for automobile body lacquers to provide the final or top coating.

Various other cellulose esters and mixed cellulose esters have been used in the past in enamels and lacquers, but a number of disadvantages place substantial limitations on the nature of the solvent and plasticizer. For example, most cellulose esters are incompatible with thermosetting acrylics, particularly those which contain styrene. A substantial proportion of oxygenated solvents such as ketones, esters, alcohols and the like are usually required for acrylic lacquers containing cellulose esters, since the latter are usually hydrocarbon insoluble.

One known prior art lacquer composition for top coatings comprises polymethyl methacrylate and an aliphatic cellulose ester, such as cellulose acetate butyrate. Even though these coatings produce durable and attractive finishes, there are certain disadvantages to their use. The combination of polymethyl methacrylate with most aliphatic cellulose esters, such as cellulose acetate butyrate, is basically an incompatible one. By the use of plasticizers, it is possible to obtain workable combinations of cellulose acetate butyrate with polymethyl methacrylate. Such combinations appear to be compatible after air-drying at room temperature; however, all commercial grades of cellulose esters show some degree of incompatibility with polymethyl methacrylate if they are baked at 200–300° F. This incompatibility is evidenced by a haziness in a clear film which has been cast on glass. Such haziness or incompatibility is not desirable, since it detracts from the overall appearance of the pigmented coating, especially when darker colored pigments are used. In accordance with the present invention, the use of cellulose butyrate benzoate with polymethyl methacrylate produces films with excellent compatibility, even after a high temperature bake at 300° F. for 30 minutes.

Another disadvantage of the present automotive topcoats based on plasticized cellulose acetate butyrate compositions is their tendency to water spot. Water spotting occurs when the surface temperature of the automotive topcoat becomes elevated, thereby producing a noticeable softness to the lacquer coating. When hard water droplets, bird droppings, tree sap, etc., are deposited on the soft coating, permanent damage to the finish results. The temperature at which a lacquer will water spot varies as the ratio of plasticizer to cellulose acetate butyrate to acrylic and the ratio of pigment to binder vary. It has been determined that one typical automotive formulation, which uses cellulose acetate butyrate with a polymethyl methacrylate polymer and a plasticizer, begins to water spot at 125–130° F. When cellulose butyrate benzoate is used according to the present invention to replace the cellulose acetate butyrate in this typical formulation, the beginning water-spot temperature is raised to 143–148° F. This improvement in water spot resistance is quite noteworthy, since the trade considers a 5° F. improvement as significant.

Most cellulose esters are not soluble in hydrocarbon solvents such as toluene, xylene, and the like; rather to produce stable uniform solutions, oxygenated solvents such as ketones, esters, ether-esters and ether-alcohols are required. Conversely, polymethyl methacrylate resins are readily soluble in aromatic hydrocarbon solvents. A typical unpigmented cellulose acetate butyrate-acrylic automotive lacquer is illustrated as follows:

| | Wt. percent |
|---|---|
| Polymethyl methacrylate | 15.0 |
| Cellulose acetate butyrate (CAB EAB–381–2) | 7.2 |
| Butyl benzyl phthalate | 7.8 |
| Acetone | 21.0 |
| Ethylene glycol monoethyl ether acetate | 21.0 |
| Toluene | 22.0 |
| Xylene | 10.0 |
| | 100.0 |

The non-hydrocarbon solvents are essential to obtain a workable formulation.

In recoating or patching a previously coated article, a problem sometimes encountered is surface crazing. Where oxygen-containing compounds are the solvents in the recoating composition the tendency toward crazing of previously applied acrylic coatings is much greater than in the case of hydrocarbon solvents.

One object of the invention is to overcome or minimize such problems and disadvantages as are mentioned above.

Another object of the invention is the provision of coatings, coating compositions, and coating methods using acrylic resins and a cellulose ester, wherein hydrocarbon solubility, craze resistance, water spot resistance, plasticizer compatibility and polymer compatibility are enhanced.

These and other objects which will become apparent are attained, as has been mentioned heretofore, by the use of cellulose butyrate benzoate as the cellulose ester.

The acrylic polymer used in the lacquer is at least predominantly of methyl methacrylate, and in the case of copolymers, comprises up to about 50% or even higher for certain applications, by weight of another alkyl acrylate or alkyl methacrylate, such as ethyl acrylate, octyl acrylate, lauryl acrylate, ethyl methacrylate, dodecyl methacrylate, stearyl-methacrylate, 2-ethyl-lauryl-methacrylate and the like, or mixtures thereof, or a vinyl compound such as vinylacetate, acrylonitrile, or styrene. Such acrylic polymers for lacquers and combinations thereof with cellulose esters are described for example in Patent Nos. 2,849,409; 2,907,722; 3,055,851 and 3,726,905. The lacquers are free of highly unsaturated compounds such as drying oils and drying type alkyds, and of driers such as metal naphthenates.

One of the important aspects of the invention resides in the fact that the lacquers are soluble in the less expensive hydrocarbon solvents, particularly aromatic hydrocarbons such as toluene or xylene. Of course, the invention does not require the use of such solvents. For example solvents such as lower ketones, esters, halogenated hydrocarbons, terpenes, alcohols, nitroalkanes and mixture thereof, all as are known to the art.

Various plasticizers are known to the art and are useful in the invention. These include the widely used butyl benzyl phthalate, neopentylglycol dibenzoate, triphenyl phosphate, methylpentanediol dibenzoate, diethyleneglycol dibenzoate, and the like. Others are described in the art such as the patents noted heretofore. About 1–40%, by weight based on the polymeric ingredients, of the plasticizer is suitable, with about 15 to 30% being preferred.

Any of the conventional pigments such as lampblack, Para Red, Phthalocyanine Blue, Phthalocyanine Green, Lithol Red, Hansa Yellow G, Thio-Indigo, Red-Violet, and the like are useful. Sometimes they are used with tinting or opacifying pigments such as titanium dioxide or aluminum pigment. Other additives, such as U.V. inhibitors, flow control agents, antioxidants and the like are useful.

Cellulose butyrate benzoates useful in the invention desirably have the following characteristics:

| | |
|---|---|
| Hydroxyl, percent | 0.5–3.5 |
| Benzoyl, percent | 15–22 |
| Butyryl, percent | 35–45 |
| Intrinsic viscosity | 0.2–1.5 |
| Melting point, ° C. | 150–160 |

The solubility of this ester is as follows:

Acetone: Hazy film—Cloudy solution
Toluene: Clear film—Clear solution
Xylene: Clear film—Clear solution
Solvent blend:[1] Clear film—Clear solution It is compatible with thermoplastic acrylics and thermosetting acrylics, including those which are copolymerized with styrene, as well as with mixtures thereof.

Where a thermoplastic system is used, a useful procedure of applying the resin is the thermal reflow method, wherein the coating is hardened, localized imperfections are removed as by sanding, then the coating is heated to the point where it reflows and forms a smooth finish.

Thermosetting acrylic resins and their cross-linking agents, particularly melamine resins such as melamine-formaldehyde, suitable for use in this invention are made by processes well known to the art. Examples of acrylic resins which have been found to give satisfactory results in the practice of this invention include the following:

Acrylic resin No. 1—Composition:   Weight percent
  Acrylamide _____ 15.0
  Styrene _____ 82.5
  Methacrylic acid _____ 2.5
                                              ─────
                                              100.0

Acrylic resin No. 2—Composition:
  Acrylamide _____ 15.0
  Methyl methacrylate _____ 25.0
  Ethyl acrylate _____ 60.0
                                              ─────
                                              100.0

Acrylic resin No. 3—Composition:
  Hydroxy alkyl methacrylate _____ 20.0
  Styrene _____ 60.0
  Methyl methacrylate _____ 20.0
                                              ─────
                                              100.0

Acrylic resin No. 4—Composition:
  Methyl acrylamide _____ 17.5
  Ethyl hexyl acrylate _____ 24.0
  Styrene _____ 58.5
                                              ─────
                                              100.0

Other known thermosetting acrylic resins may of course be employed. It is particularly noted that the invention encompasses all of those thermosetting acrylic resins

[1] n-Butyl alcohol _____ 10
    n-Butyl acetate _____ 33
    Ethyl alcohol _____ 15
    Toluene _____ 25
    Xylene _____ 17
                                                   ───
                                                   100 which are characterized by being cross-linkable by polyfunctional agents to give hard, durable coatings.

The melamine-formaldehyde resins which are suitable for use in this invention are made by processes well known to the trade. Among the melamine-formaldehyde resins that have been found to be particularly applicable in this system are the butylated melamine-formaldehyde resins such as those sold under the trade names Plaskon 3382 (Allied Chemical Corp.), Resimene 879 (Monsanto Chemical Corp.), and Beckamine 1216–S (Reichold Chemical Corp.). Another melamine-formaldehyde resin which gives very satisfactory results is hexamethoxymethyl melamine-formaldehyde resin, that resin sold under the trade name Cymel 300 (American Cyanamid Corp.).

The thermal reflow bake-sand-bake method is also useful with the thermosetting acrylics, and with the melamine-formaldehyde resins, for the reason that the cellulose butyrate benzoate gives a temporary thermoplasticity to the lacquer coating. This allows thermal reflow prior to the onset of crosslinking of the thermosetting acrylic resin.

The first bake temperature in this system is limited and will vary depending upon the type of acrylic and/or melamine-formaldehyde resins that are used. If the low-bake temperature exceeds the point where any crosslinking has started, the system will not be thermally reflowable after it has been wet sanded. Experiments have shown that these first bake temperatures are at a low bake range and will vary from about 70° to about 225° F. Furthermore, the maximum time permissable for such a baking temperature if above room temperature, varies from about 30 minutes to about 2 hours.

The second or higher bake operation may be conducted at a temperature range of between 250–450° F.

The useful proportions of cellulose butyrate benzoate vary widely. The weight ratio of the cellulose ester to the acrylic polymer is between about 1 to 9 and 8 to 2, preferably with the ester in a minor proportion between about 2 to 8 and 4 to 6.

The following examples are illustrative of the invention as well as of similar materials not included in the invention. Unless otherwise stated, the invention is not intended to be limited to the examples.

EXAMPLE 1

This series of lacquers point up the improved compatibility of the invention over existing compositions. It refers specifically to thermoplastic acrylic lacquers.

TABLE 1

| | A | B | C |
|---|---|---|---|
| Polymethyl methacrylate | 10.0 | 10.0 | 10.0 |
| Butyl benzyl phthalate | 5.2 | 5.2 | 5.2 |
| Cellulose acetate butyrate (EAB-381-2) | 5.4 | | |
| Cellulose acetate propionate (EAP-482-20) | | 5.4 | |
| Cellulose butyrate benzoate | | | 5.4 |
| Acetone | 24.0 | 24.0 | |
| Ethylene glycol monethyl ether acetate | 24.0 | 24.0 | |
| Toluene | 21.4 | 21.4 | 45.4 |
| Xylene | 10.0 | 10.0 | 34.0 |
| | 100.0 | 100.0 | 100.0 |

Twenty-mil wet films were cast on glass and baked at 250° F. for 20 minutes. The following compatibility rating was made:

| | Scale |
|---|---|
| A=5 | 10=Clear, no haze |
| B=1 | 5=Moderately hazy |
| C=10 | 0=Pronounced haze |

EXAMPLE 2

These formulations illustrate the improved compatibility of the invention over existing compositions. It refers specifically to thermosetting acrylic enamels.

TABLE 2

|  | A | B | C | D |
|---|---|---|---|---|
| Thermosetting acrylic resin [1] | 21 | 21 | 21 | 21 |
| Melamine-formaldehyde resin | 9 | 9 | 9 | 9 |
| Cellulose acetate butyrate (EAB-381-1/2) |  | 10 |  |  |
| Cellulose acetate butyrate (EAB-551-0.2) |  |  | 10 |  |
| Cellulose butyrate benzoate |  |  |  | 10 |
| Toluene | 20 | 10 | 10 | 30 |
| Xylene | 29 | 9 | 9 | 20 |
| Ethyl alcohol | 10 | 10 | 10 |  |
| Butyl alcohol | 11 | 11 | 11 | 10 |
| Ethyl glycol monoethyl ether acetate |  | 10 | 10 |  |
| MIBK |  | 10 | 10 |  |
|  | 100 | 100 | 100 | 100 |

[1] Composition:
| Methyl methacrylate | 70 |
|---|---|
| Methyl acrylamide | 10 |
| Styrene | 20 |
|  | 100 |

Twenty-mil wet films were cast on glass plates and baked at 275° F. for 30 minutes. The following compatibility ratings were assigned using the scale in Table 1:

A=10  C=0
B=0   D=10

EXAMPLE 3

This example illustrates the improved water-spot resistance of the invention over currently used products.

TABLE 3

|  | A | B | C | D |
|---|---|---|---|---|
| Polymethyl methacrylate | 10.0 | 10.0 | 10.0 | 10.0 |
| Butyl benzyl phthalate | 6.0 | 5.2 | 5.2 | 5.2 |
| Cellulose acetate butyrate (EAB-381-2) | 4.0 | 5.4 |  |  |
| Cellulose acetate butyrate (EAB-531-1) |  |  | 5.4 |  |
| Cellulose butyrate benzoate |  |  |  | 5.4 |
| Carbon black pigment | 0.6 | 0.6 | 0.6 | 0.6 |
| Acetone | 24.0 | 24.0 | 24.0 | 24.0 |
| Ethylene glycol monoethyl ether acetate | 24.0 | 24.0 | 24.0 | 24.0 |
| Toluene | 21.4 | 20.8 | 20.8 | 20.8 |
| Xylene | 10.0 | 10.0 | 10.0 | 10.0 |
|  | 100.0 | 100.0 | 100.0 | 100.0 |
| Water-spot temperature, °F | 101 | 111 | 121 | 143 |

EXAMPLE 4

The craze resistance of a paint describes its ability to be recoated successfully. A paint with poor craze resistance is readily attacked by the solvents in a repair coat. This attack results in the development of hairline cracks in the paint finish which are referred to as crazing. Generally, the craze resistance of an automotive lacquer decreases with a decrease in temperature. This means that at a given temperature, one can recoat or repaint the lacquer finish without encountering crazing, but as the temperature is lowered, a point is reached where crazing occurs.

The craze resistance of this invention was determined by dropping toluene at room temperature on Formula D in Table 2, and allowing it to evaporate. There was no evidence of cracks in the area where the toluene was deposited. At the same time, when acetone was dropped at room temperature on Formulation B and allowed to evaporate, minute hairline cracks appeared. When this test was determined at lower temperature, such as 40 and 50° F., greater differences were observed.

Although this invention has been described in considerable detail with particular reference to certain preferred embodiments thereof, variations and modifications can be effected within the scope of the invention as described hereinbefore.

We claim:
1. A composition comprising (1) cellulose butyrate benzoate and (2) a thermoplastic or thermosetting acrylic resin system, the weight ratio of (1) to (2) being between about 10 to 90 and 80 to 20.
2. The composition of claim 1 wherein the acrylic resin contains styrene.
3. The composition of claim 1 wherein the acrylic resin is thermosetting and the composition contains a melamine-formaldehyde resin.
4. The composition of claim 1 dissolved in suitable solvent.
5. The composition of claim 4 in which said solvent contains a predominant proportion of hydrocarbons.
6. An article of manufacture having a coating of the composition of claim 1.
7. An article of manufacture having a cured coating of the composition of claim 2.
8. An article of manufacture having a cured coating of the composition of claim 3.
9. The article of claim 7 comprising a metal substrate.

References Cited

UNITED STATES PATENTS

| 2,379,604 | 7/1945 | Swain et al. | 260—15 |
| 2,397,454 | 3/1946 | Woodward | 260—17 |
| 2,860,110 | 11/1958 | Godshalk | 260—17 |
| 3,055,851 | 9/1962 | Sanderson | 260—17 |

WILLIAM H. SHORT, Primary Examiner.
E. M. WOODBERRY, Assistant Examiner.

U.S. Cl. X.R.
117—166, 124, 161, 132; 260—17